United States Patent
Wheeler

[11] Patent Number: 6,133,983
[45] Date of Patent: Oct. 17, 2000

[54] PHOTOGRAPHIC PRINTING METHOD AND APPARATUS FOR SETTING A DEGREE OF ILLUMINANT CHROMATIC CORRECTION USING INFERENTIAL ILLUMINANT DETECTION

[75] Inventor: Richard Bruce Wheeler, Webster, N.Y.

[73] Assignee: Eastman Kodak Company, Rochester, N.Y.

[21] Appl. No.: 08/151,091

[22] Filed: Nov. 12, 1993

[51] Int. Cl.⁷ ............................. G03B 27/32; G03B 27/52
[52] U.S. Cl. ................................................ 355/40; 355/77
[58] Field of Search ....................... 355/40, 77; 354/106; 396/311

[56] References Cited

U.S. PATENT DOCUMENTS

| | | | |
|---|---|---|---|
| 4,827,119 | 5/1989 | Gaboury | 350/214 |
| 5,016,039 | 5/1991 | Sosa et al. | 354/430 |
| 5,029,313 | 7/1991 | Robison et al. | 355/40 |
| 5,037,198 | 8/1991 | Gaboury | 356/218 |
| 5,070,355 | 12/1991 | Inoue et al. | 354/413 |
| 5,168,303 | 12/1992 | Ikenouso et al. | 355/38 |
| 5,289,227 | 2/1994 | Kinjo | 355/77 |
| 5,404,196 | 4/1995 | Terashita et al. | 355/77 |
| 5,687,405 | 11/1997 | Kazami et al. | 396/155 |
| 6,038,011 | 3/2000 | Ikenoue et al. | 355/40 |

*Primary Examiner*—Russell Adams
*Assistant Examiner*—Christopher Mahoney
*Attorney, Agent, or Firm*—Francis H. Boos, Jr.

[57] ABSTRACT

A method of setting chromatic correction in exposure determining algorithms of an automatic photographic printer using inferential illuminant detection derived from data recorded at a camera during picture taking. For scenes having a scene light level above a predetermined level, daylight chromatic correction is set at the printer. For scenes having a scene light level below this level, daylight chromatic correction is set at the printer if sufficient flash illuminant is determined from the recorded data to exist in the image otherwise a non-daylight chromatic correction corresponding to a high degree of chromatic correction is set at the printer.

11 Claims, 2 Drawing Sheets

PHOTOGRAPHIC PRINTING METHOD AND APPARATUS FOR SETTING A DEGREE OF ILLUMINANT CHROMATIC CORRECTION USING INFERENTIAL ILLUMINANT DETECTION

FIELD OF INVENTION

This invention relates to the field of photographic systems with provision for detection of scene illuminant and the use thereof to provide chromatic correction in the photographic printing process.

BACKGROUND

Scene color balance algorithms employed in automatic printers conventionally employ measurements of film density (R,G,B) and related mathematical techniques to attempt to deduce from the film the optimum level of chromatic correction to be applied on a scene-by-scene basis to the exposure of the film to photographic print paper. It is known that scene color-induced printer correction failures occur when the printer algorithm is unable to differentiate between sources of color variability in the film image that require high levels of chromatic correction (e.g. non-daylight illuminants, film processing effects, film keeping effects and manufacturing variability) and source of color variability that do not require high levels of chromatic correction, (e.g. highly colorful objects in the scene). It is desirable, therefore, to be able to identify and segregate sources of color variability according to the level of chromatic correction required.

One of the most common causes of color variability in the film image is scene illuminant. It is useful to be able to identify the type of scene illuminant and input this information to the printer algorithm for use in selecting and applying the appropriate level of chromatic correction. In commonly assigned U.S. Pat. Nos. 4,827,119 and 5,037,198, camera apparatus is described which is capable of detecting and discriminating among the various common sources of scene illuminants: natural, tungsten and fluorescent, by performing a Fourier series analysis on one or more of the harmonics of the illuminant signal generated from a light sensor in the camera. It is possible to record this discriminated data at the time of image capture for transfer to the photofinishing printer to be applied to the exposure determining algorithm process. Such data recording transfer processes might be, for example, optical data recording as a latent image on the film, magnetic data recording either on a magnetic layer formed on the film or on separable magnetic media, or electronic recording on a programmable memory medium (EEPROM).

The employment of specialized illuminant detection and discrimination apparatus such as referred to above, while effective for the purpose, has the disadvantage of adding cost and complexity to the camera design. Moreover, such systems are based on detection of known harmonic frequencies and are therefore limited to existing sources of illuminant. New light sources generating different harmonic frequencies would require new detection apparatus thus obsoleting existing cameras. The added cost of performing Fourier series based analysis in the camera could well preclude its use in lower cost cameras thus limiting the general use of illuminant detection techniques for improved chromatic correction in printing processes.

In U.S. Pat. No. 5,016,039 there is described camera apparatus for sensing and recording certain scene illuminant information which is to be read and utilized at a photographic printer to control exposure of the film image onto print paper. The information recorded involves light level, flash fire and subject distance to determine color temperature of the scene illuminant. A complex analysis is performed in an attempt to discriminate precisely among different range of daylight-related color temperatures and to discriminate among different non-daylight illuminants. In a low light level (non-daylight) scene, when the subject distance exceeds the point at which flash is effective, the patent teaches the use of a color temperature meter to accurately determine the scene illuminant color temperature to be recorded and conveyed to the photographic printer. No mention is made of how the photographic printer algorithms make use of the recorded and conveyed information. Moreover, the apparatus disclosed involves complex calculations to finely discriminate among the various scene illuminants and light levels to record precise color temperature information. It also requires the use of a color temperature meter to achieve illuminant discrimination in all regions of the scene photospace. All of this raises the cost and complexity of the camera apparatus and does not address the problem of providing simplified algorithm operation of photographic printer exposure techniques.

In U.S. Pat. No. 5,168,303, techniques are described for determining control of photographic printer algorithms from data recorded at the time of picture taking. This patent discloses numerous methods for estimating, at the printer, the color temperature of the scene illuminant from data such as light value, flash fire, time and date of taking the picture and the geographical location where the picture was taken. This information is then used to control the printer exposure algorithms to automatically override the density-based exposure determinants, including chromatic correction, so as to preserve the color cast of the scene illuminant in the print (except for elimination of greenish cast caused by fluorescent illuminant, this being an added step requiring complex illuminant detection and/or algorithm manipulation). The effect achieved by the disclosure of this patent is the opposite of the objective of the present invention which is to provide a simple method of removing the color cast created by non-daylight scene illuminant from the printed image.

It is therefore an object of the present invention to provide a simplified photographic system for detecting and discriminating scene illuminants for use in setting appropriate levels of chromatic correction in the photographic printing process.

It is another objective of the invention to achieve appropriate chromatic correction at a photographic printer by a simplified inference as to the scene illuminant that does not require complex discrimination of many different levels and types of scene illuminant.

It is a still further object of the invention to provide simplified illuminant detection and discrimination for control of automatic printer chromatic correction algorithms that utilizes data derived from existing conventional sensor apparatus typically found in the camera.

SUMMARY OF THE INVENTION

Thus in accordance with a first aspect of the present invention, there is provided a photographic printing method for exposure of a film image frame onto print paper in which a degree of chromatic correction is set from information recorded at a camera derived from picture-taking data which comprises:

detecting at a photographic printer said recorded information;

determining from said detected information, instructions relating to scene light level and the existence or nonexistence of a predetermined amount flash illuminant in the film image frame;

setting a low degree of illuminant chromatic correction corresponding to daylight correction when the instructions relate to either (a) a scene light level above a predetermined value or (b) a scene light level below the predetermined value and that said predetermined amount of flash illuminant exists in the film frame image; and setting a high degree of illuminant chromatic correction corresponding to non-daylight correction when the instructions relate to a scene light level below the predetermined value and that said predetermined amount of flash illuminant does not exist in the film frame image.

DETAILED DESCRIPTION

Figure 1:
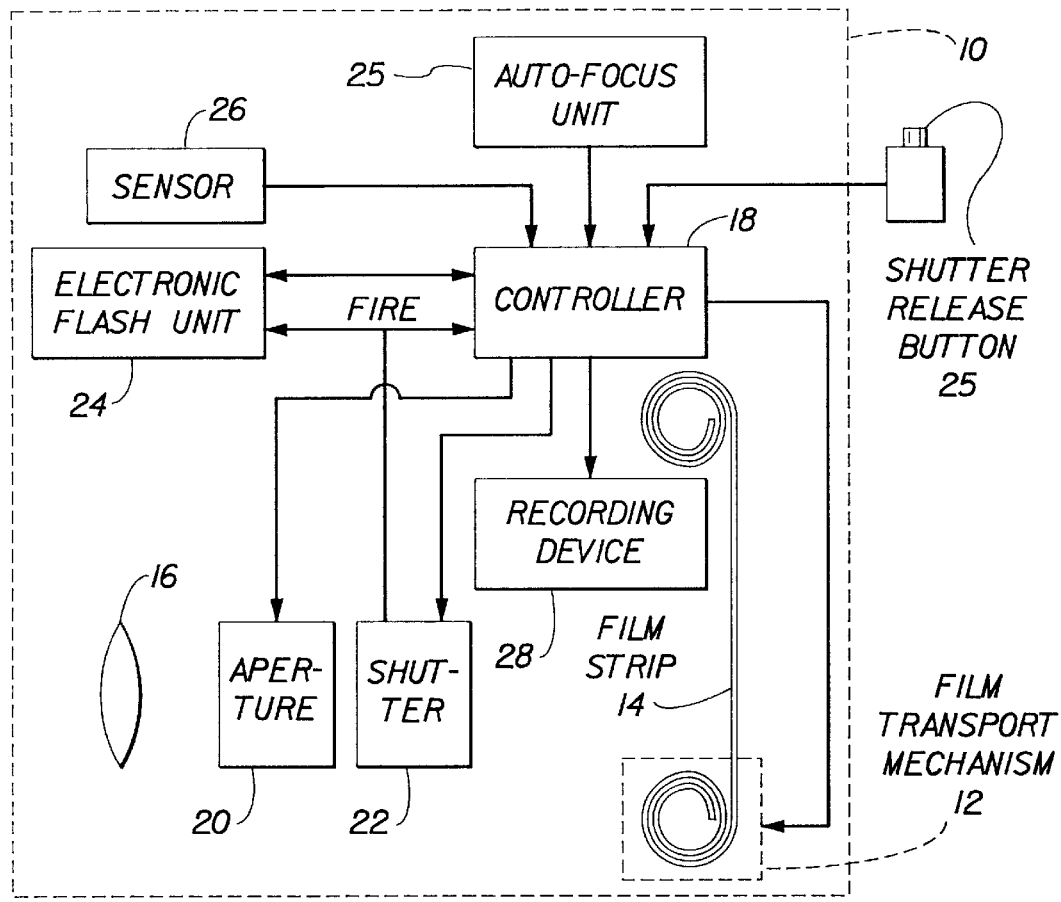
FIG. 1 is a schematic illustration of a photographic camera adapted for recording picture taking data useful in the present invention.

Referring now to the drawings, FIG. 1 shows a photographic camera 10 including a film transport mechanism 12 for supporting and advancing a silver halide film strip 14. A lens 16, aperture mechanism 20 and shutter mechanism 22 are positioned to control the exposure of picture frames onto film strip 14. A controller 18, for example a microprocessor, is connected to the aperture and shutter mechanisms 20, 22 and to film transport mechanism 12. An electronic flash unit 24 is connected to controller 18 for communicating charge and operational status data therewith and to shutter 22 for receiving a "FIRE" signal so as to be activated. A shutter release button 25 is connected to controller 18, operation of the shutter release button causing the controller to set aperture 20 and actuate shutter 22.

The camera may also include an auto-focus unit 25 connected to the controller for determining camera to subject distance and setting the focus of lens 16 in known manner.

Camera 10 further includes a light level sensor 26 and a recording device 28, both connected to controller 18. Sensor 26 is selected and positioned so as to sense scene light level and may comprise a conventional auto-exposure sensor used for calculating exposure of the image onto the film 14. Sensor 26 is also useful for detecting returned flash illumination in the imaged scene for purposes described later. Recording device 28 preferably comprises a magnetic recording head for magnetically encoding data onto a magnetic recording layer formed on the surface of film 14. Although this is a preferred recording mechanism for the present invention, other known recording techniques might also be utilized, such as optical and mechanical recording or magnetic recording on separable magnetic media such as discs or integrated circuit cards. A variety of data can be recorded at the camera as is described in commonly assigned U.S. Pat. No. 5,229,810, the disclosure of which is incorporated herein by reference. However, the particular data that is of interest for the present invention is that which relates to scene light level and to whether there is likely to be a predetermined amount of flash illuminant in the exposed scene as will be explained in more detail later.

Figure 2:
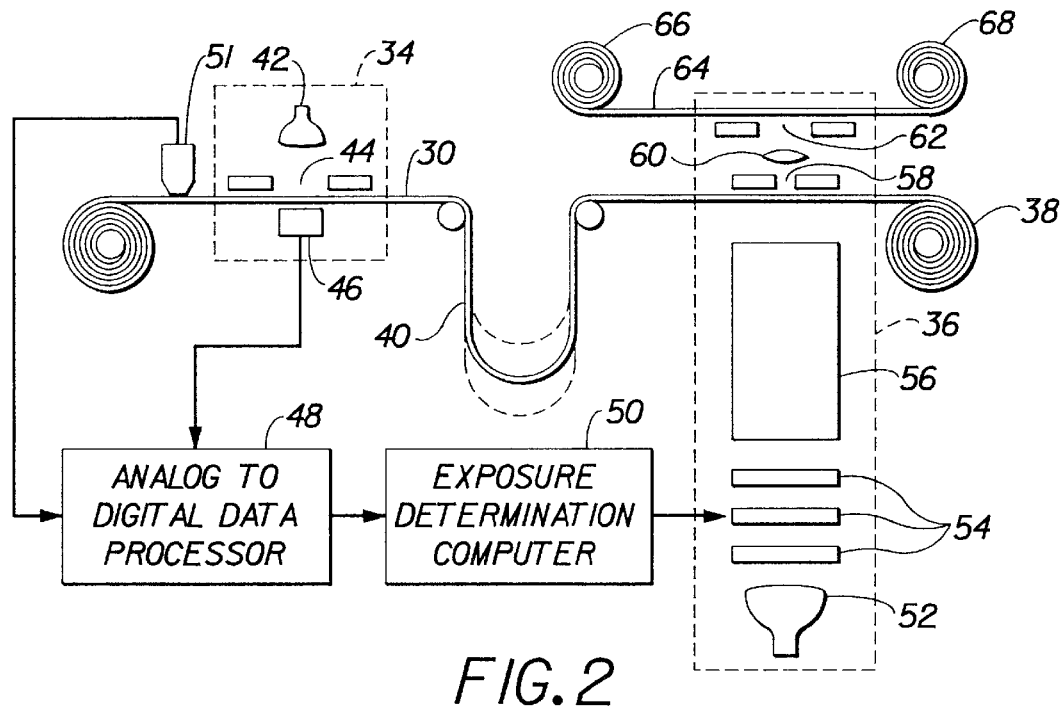
FIG. 2 is a schematic illustration of a photographic printer adapted to utilized the data recorded at the camera in accordance with the novel features of the present invention.

A photographic printer adapted for the present invention is shown in FIG. 2. In the illustrated printer, a roll of processed photographic film 30 is advanced by transport means (not shown) from a supply reel 32 through an exposure determination film scanner 34 and a photographic print station 36 to a takeup reel 38. An optional film loop buffer stage 40 may be provided to allow for any momentary differences in the film transport speeds between the scanner and print station.

Exposure determination film scanner 34 is typically provided with a light source 42 to shine light through a film image frame on film 30 positioned in a scanner frame gate 44. The resultant image light impinges on a scanning image sensor 46 which may take the form of a linear or two dimensional area array charge coupled device (CCD). A virtual contact scanner useful in scanner 34 is described in commonly assigned U.S. Pat. No. 5,153,715 issued Oct. 6, 1992, the disclosure of which is incorporated herein by reference. The output of sensor 46, in a scanned-pixel analog signal form, is applied to an analog-to-digital data processor 48 to be converted in known manner into digital values representative of the analog pixel information received from scanner sensor 46. This digital data is then applied to an exposure determination computer 50 which operates in well known manner to determine the correct film exposure values for normal optical printing in print station 36. A data sensor 51, preferably a magnetic read head, is provided to read the data magnetically recorded at the camera. This sensed data is converted to digital data in A/D converter 48 and coupled to the exposure determination computer 50.

Print station 36 conventionally includes an optical printer light source 52, color filters 54, light integrating box 56, film gate 58, imaging optics 60 and print gate 62. A length of photographic print paper 64 is advanced by suitable transport means (not shown) through print station 36 from supply reel 66 to takeup reel 68 in synchronism with the advance of film 30. The images on film 30 are successively exposed onto print paper 64 with suitable adjustment of the color filters 54 under the control of the signals from computer 50 to set the desired exposure conditions for printing of the film image frame.

As is well known, in photographic printing of color images using automatic printing techniques that employ computer algorithms to determine the spectral characteristics of the exposure of the film image to the print paper, the color accuracy of the printed images can by enhanced by segregating images according to the illuminant type under which the original film image exposures were made at the camera and assigning chromatic correction levels based on the sorting. Commonly assigned U.S. Pat. No. 4,827,119 describes a technique that permits segregation of the film image exposing light source into several predominant illuminant categories, namely daylight, tungsten and fluorescent. It is also known that multiple subject failure suppression (SFS) boundaries based on illuminant are useful in application of exposure determination algorithm to provide customized color balance offsets for each of these illuminant types.

The present invention provides enhanced printer color correction for all illuminants, whether day or non-daylight, using a method that is much less complex and less costly to implement than the specific illuminant discrimination methods heretofore proposed and mentioned above. An important feature of this novel method is the unexpected discovery that exposures made on daylight-balanced films, from scenes illuminated by non-daylight-balanced sources of any kind, will be rendered most accurately in the final display (e.g. print) when high levels of chromatic correction are applied. This realization eliminates the need for a separate predefined color balance position for each separate illuminant type. Stated another way, when any non-daylight illuminant (e.g. tungsten, fluorescent or halogen) is used to expose a scene on daylight-balanced film, the difference between the film's scanned color density record and the density record of a typical daylight-exposed scene should be treated with high levels of chromatic correction. This is because the density deviation in the exposed film image is substantially caused by the illuminant variation (relative to daylight) and should therefore be entirely removed.

Modern automatic optical printers, such as are represented by the Kodak Model 3510 Color Printer or the Kodak CLAS 35 Color Printer are designed to provide up to 100% chromatic correction when needed. Typically the level of chromatic correction is suppressed, by the SFS boundary, to provide a more moderate level of correction to avoid overcompensating for subject-matter color failures, which are also part of the film image's scanned density record, when they are photographed under daylight or daylight-balanced flash. However, when non-daylight illuminants have been identified by the present method of inferential illuminant detection, high levels of chromatic correction can be applied advantageously to remove the unwanted color casts that would otherwise degrade the quality of the images.

In accordance with a particular feature of the invention, the following scene-specific measurements, recorded at the camera at the time of exposure of each film frame image can be used to enable and inferential illuminant detection.

Scene light level (SLL)
Camera-to-subject distance (D)
Flash fire signal
Flash return signal Specific combinations of these easily obtained measurements can be can be used to establish simple rule sets that determine whether daylight-balanced illumination (DL) or non-daylight balanced illumination (NDL) is present in the scene as captured on the film image frame. Once the illuminant is determined inferentially from this data as being either daylight-balanced or non-daylight-balanced, the appropriate level of illuminant chromatic correction is then applied by the automatic printer algorithm.

Figure 3:
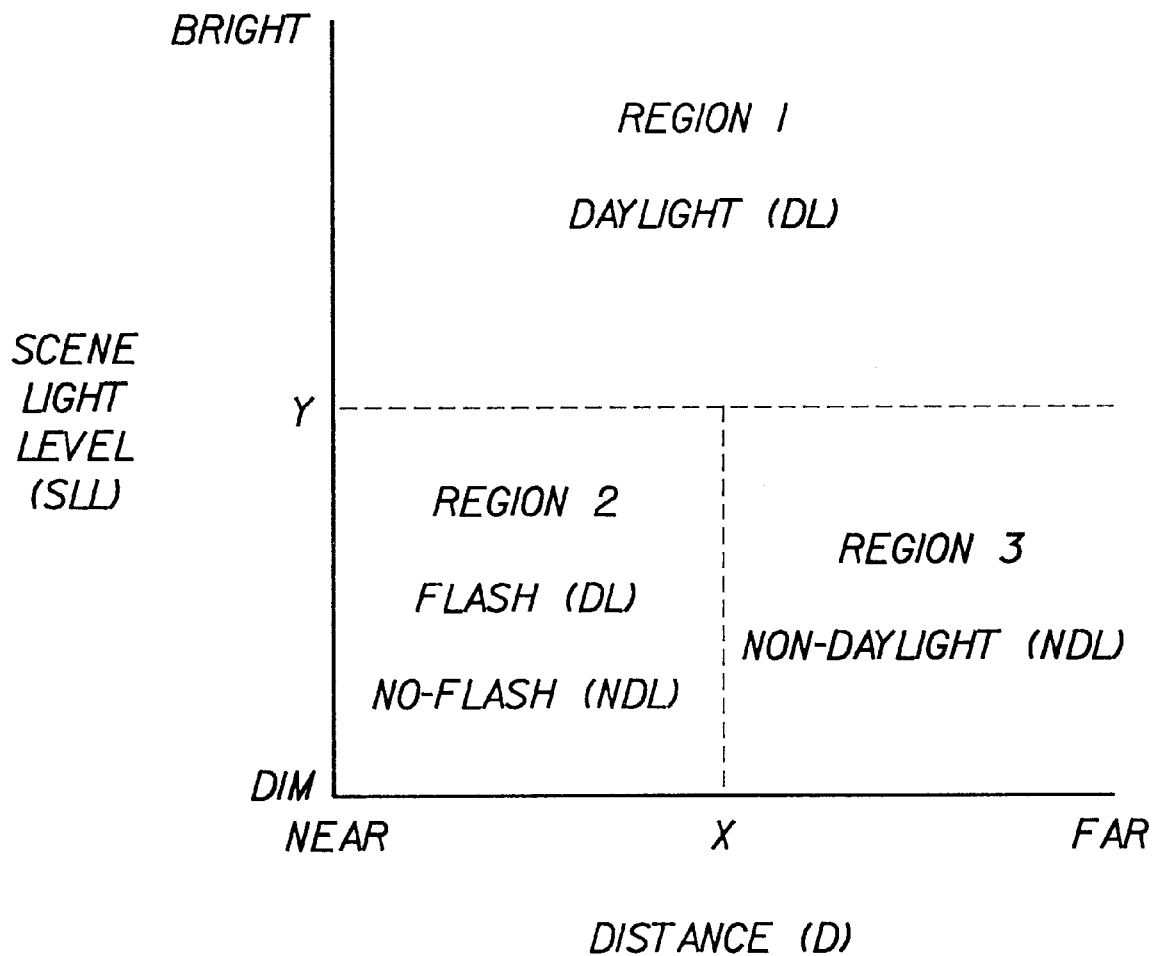
FIG. 3 is a graph illustrating scene brightness vs subject distance photospace useful in explaining the principals of the present invention.

The unexpected discovery that exposures made on daylight-balanced films from scenes illuminated by non-daylight-balanced sources of any kind will be rendered most accurately in the final display (e.g. print) when high levels of chromatic correction are applied, led to the realization that a method capable of segregating illuminants into two classes (daylight-balanced and non-daylight-balanced), rather than into a separate class for each illuminant (e.g. tungsten, fluorescent, mercury-vapor, halogen), will significantly improve the color quality of images generated by automatic printers. The ability to properly segregate illuminants into these two classes in a simple and efficient manner using conventional camera-based scene sensor resulted in the inferential illuminant detection and printer control method described herein. Referring to FIG. 3, the inferential illuminant detection method is implemented by segmenting the scene photospace into three distinct regions and applying knowledge-based rules to infer the illuminant category most likely to occur within a given region using the data recorded at the camera at the time of scene exposure. In FIG. 3, Region 1 is the area designated "Daylight" and encompasses all camera-to-subject distances from near to far for all scene light levels above a predetermined level Y. This level Y normally corresponds to the level at which flash turn-on occurs at the camera although, in some instances, it may be slightly different. This is the region of the photospace that is typically characterized by natural daylight illumination. Consequently, when a scene light level (SLL) is indicated as being in this region, the exposure determination computer applies daylight chromatic correction. This generally corresponds to a low or weak level of chromatic correction. The light level Y, in foot-lamberts, may be calculated with the following formula:

$$Y = \frac{KA^2N}{ST}$$

where:
K=ANSI exposure constant (typically 3.91)
A=camera lens f-number
S=ISO film speed
T=camera shutter time
N=desired exposure bias
(1.0=normal exposure; 0.5=−1 stop; 0.25=−2 stops)

Typically, the camera exposure control system is designed with N between 0.5 and 1.0 so that the flash system will become active when the ambient illumination is no longer at a level sufficient to cause a normal exposure on the film currently loaded in the camera.

In the graph of FIG. 3, Region 2, designated Flash/No-Flash, encompasses the limited region that exists below the scene light level Y at which flash would normally be activated and for camera-to-subject distances that are less than or equal to the maximum flash effective distance X. This is the photospace area that is generally characterized by the occurrence of daylight-balanced flash illumination in the captured scene. Thus, within this region, assuming flash is fired, flash illuminant is the predominant scene illuminant, referred to herein as a predetermined amount of flash illuminant. Accordingly, daylight chromatic correction is appropriate for scene images captured within this region, providing the flash actually fired. The fact of flash fire can be indicated by recording the existence of the flash fire signal at the camera that is sent from the shutter to the flash unit 24 (FIG. 1). The camera-to-subject distance corresponding to the maximum effective flash distance X, in feet, may be illustratively calculated with the following formula:

$$X = \frac{GN}{A\sqrt{N}}$$

where:
GN=flash guide number for a particular ISO film speed and distance scale (e.g. GN=$^{32}$ISO 100 feet)
A=camera lens f-number
N=desired exposure bias
(1.0=normal exposure; 0.5=−1 stop; 0.25=−2 stops)

The fact that the subject distance is less than the maximum effective flash distance X can be determined by recording the subject distance at the camera based on an autofocus reading. If the distance is less than X and flash fire is recorded then daylight chromatic correction is applied by the photographic printer exposure algorithm. An alternative approach to determining whether the subject is in this Region 2 of the photospace involves determining and recording the existence of a predetermined amount of flash return as sensed by the exposure photometer in the camera. This operation is described in detail in commonly assigned international application which is the subject of International Publication WO-89/09946, corresponding to U.S. Pat. No. 5,333,113 the disclosure of which is incorporated herein by reference.

As noted above, Region 2 is the photospace area that is typically characterized by daylight-balance flash illumination; therefore daylight chromatic correction is appropriate for images captured within this region when the flash illuminant is present in the film image. However, if the flash is not present, as determined by either of the above described methods, the illumination is most likely to be artificial. As a result, non-daylight chromatic correction is then applied by the exposure determination computer to images captured in this region.

Region 3, designated as Non-Daylight, encompasses the limited photospace area where camera-to-subject distances are greater than the maximum flash effective distance X and the scene light levels are less than the calculated light level Y. This is the photospace area that is characterized by non-daylight balanced artificial illumination. Accordingly, non-daylight chromatic correction, which corresponds to a high level of chromatic correction, preferably 100%, is appropriate for images captured in this region. As with Region 2, the light level is determined from the data from sensor 26 and the "beyond distance X" is determined by one of the data representing either flash fire with subject distance or flash return signal as described above.

Since the goal of the invention is to improve the color quality of images generated by automatic printer algorithms, by applying the appropriate level of chromatic correction to the printing process, the logic flow associated with the rule sets described above can be executed either in the camera or at the photographic printer. If executed in the camera, the chromatic correction instructions can be recorded on the film at the camera and passed directly to the exposure determination computer. If executed in the printer, the raw picture taking data relating to scene light level and that the subject was within flash range (either in the form of flash fire signal and subject distance or as a flash return signal) can be recorded at the camera and passed to the exposure determination computer for appropriate determination of the chromatic correction instructions.

It should be apparent from the foregoing that what has been described is a method that advantageously utilizes inferential illuminant detection to improve the color quality of images generated by automatic optical printers in a simplified manner. It will be equally apparent to those skilled in the art that the method can be employed to improve color quality of image produced by other display or reproduction means such as Photo CD video displays, thermal printers, CRT displays and printers and electrophotographic printers.

The invention has been described in detail with particular reference to presently preferred embodiments. It will be appreciated that the use of other standard or non-standard methods for denoting scene light level and effective flash distance are obvious to those skilled in the art. It will therefore be understood that variations and modifications can be effected within the scope of the invention as set forth in the claims appended hereto.

In the accompanying drawings, the following reference numerals are used:
10 camera
12 film transport mechanism
14 film strip
16 lens
18 controller
20 aperture mechanism
22 shutter mechanism
24 electronic flash unit
25 auto-focus unit
26 light sensor
28 recording device
30 processed film strip
32 processed film supply reel
34 film scanner
36 photographic print station
38 processed film takeup reel
40 film loop
42 scanner light source
44 scanner film gate
46 CCD scanner
48 A/D converter
50 exposure determination computer
51 data sensor
52 printer light source
54 printer color filters
56 integrating light box
58 printing gate
60 imaging optics
62 print gate
64 photographic print paper

What is claimed is:

1. A method of operating a photographic printer for exposure of a film image frame onto print paper in which a degree of illuminant chromatic correction is set from information recorded at a camera derived from picture-taking data; the method comprising:

detecting at a photographic printer said recorded information;

determining from said detected information instructions relating to scene light level and the existence or non-existence of a predetermined amount of flash illuminant in the film image frame;

setting a low degree of chromatic correction corresponding to daylight correction when said instructions relate to either (a) a scene light level above a predetermined value or (b) a scene light level below a predetermined value and that said predetermined amount of flash illuminant exists in the film frame image; and setting a high degree of chromatic correction corresponding to non-daylight correction when said instructions relate to a scene light level below said predetermined value and that said predetermined amount of flash illuminant does not exist in the film frame image.

2. The method of claim 1 wherein said predetermined value of scene light level, in foot-lamberts, is determined from the equation:

$$Y = \frac{KA^2 N}{ST}$$

where:
K=ANSI exposure constant (typically 3.91)
A=camera lens f-number
S=ISO film speed T=camera shutter time N=desired exposure bias.

3. The method of claim 2 wherein said information recorded at the camera comprises an instruction to set said appropriate chromatic correction derived from calculation of said equation at the camera and said instruction is read at the photographic printer to set the chromatic correction.

4. The method of claim 2 wherein an instruction to set said appropriate chromatic correction derived from calculation of said equation at the photographic printer and the photographic printer sets said appropriate chromatic correction in response to said instruction.

5. The method of claim 1 wherein said information recorded at the camera at the time an image is captured on film comprises information representative of scene light level, distance from the camera to the subject and whether or not flash has been fired and said high degree of chromatic correction is set in response to said information indicating the combined circumstance that said scene light level is below said predetermined value and either that said flash has not been fired or said flash was fired but said camera-to-subject distance is beyond a predetermined flash effective distance.

6. The method of claim 5 wherein said maximum flash effective distance, in feet, is determined from the equation:

$$X = \frac{GN}{A\sqrt{N}}$$

where:

GN=flash guide number for a particular ISO film speed and distance scale (e.g. GN=32ISO 100 feet)

A=camera lens f-number

N=desired exposure bias.

7. The method of claim 6 wherein said information recorded at the camera comprises an instruction to set said appropriate chromatic correction derived from calculation of said equation at the camera and said instruction is read at the photographic printer to set the chromatic correction.

8. The method of claim 6 wherein an instruction to set said appropriate chromatic correction derived from calculation of said equation at the photographic printer and the photographic printer sets said appropriate chromatic correction in response to said instruction.

9. The method of claim 1 wherein said information recorded at the camera at the time an image is captured on film comprises information representative of scene light level and a flash return signal which indicates whether a subject is within or beyond a predetermined maximum flash effective distance and said high degree of chromatic correction is set in response to said information indicating the combined circumstance that said scene light level is below said predetermined value and that said flash return signal indicates a subject beyond a predetermined maximum flash effective distance.

10. The method of claim 9 wherein said information recorded at the camera comprises an instruction to set said appropriate chromatic correction derived from measurement of said flash return signal at the camera and said instruction is read at the photographic printer to set the chromatic correction.

11. The method of claim 9 wherein an instruction to set said appropriate chromatic correction derived from evaluation of said flash return information at the photographic printer and the photographic printer sets said appropriate chromatic correction in response to said instruction.

* * * * *